United States Patent
Bath et al.

(10) Patent No.: US 12,399,800 B1
(45) Date of Patent: *Aug. 26, 2025

(54) INGEST HEALTH MONITORING WITH FAILURE INDICATOR

(71) Applicant: Splunk Inc., San Francisco, CA (US)

(72) Inventors: Amritpal Singh Bath, Alamo, CA (US); Samat Jain, San Francisco, CA (US); Felix Jiang, San Jose, CA (US); Shanmugam Kailasam, Cupertino, CA (US); Jibang Liu, San Jose, CA (US); Isabelle Park, Glendale, CA (US); Vishal Patel, San Francisco, CA (US); Divya Vijayan, Pleasant Hill, CA (US); Jiahan Wang, San Mateo, CA (US); Tingjin Xu, Dublin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/763,753

(22) Filed: Jul. 3, 2024

Related U.S. Application Data

(63) Continuation of application No. 17/877,725, filed on Jul. 29, 2022, now Pat. No. 12,061,533.

(51) Int. Cl.
G06F 11/34 (2006.01)
G06F 3/06 (2006.01)

(52) U.S. Cl.
CPC ........ G06F 11/3476 (2013.01); G06F 3/0619 (2013.01); G06F 2201/81 (2013.01)

(58) Field of Classification Search
CPC . G06F 11/3476; G06F 2201/81; G06F 3/0619

USPC ............................................. 714/37, 39, 45
See application file for complete search history.

(56) References Cited

U.S. PATENT DOCUMENTS

| | | | |
|---|---|---|---|
| 10,936,395 B1* | 3/2021 | Varma | G06F 11/079 |
| 2005/0149536 A1* | 7/2005 | Wildes | G06F 8/20 |
| 2012/0166576 A1* | 6/2012 | Orsini | H04L 67/1097 709/217 |
| 2020/0264783 A1* | 8/2020 | Patel | G06F 3/064 |
| 2021/0156401 A1* | 5/2021 | Cristofori | F15B 1/021 |
| 2021/0279070 A1* | 9/2021 | Shaw | G06F 16/1824 |
| 2021/0326184 A1* | 10/2021 | Muraleedharan | G06F 21/53 |

* cited by examiner

*Primary Examiner* — Chae M Ko
(74) *Attorney, Agent, or Firm* — Shook, Hardy & Bacon L.L.P.

(57) ABSTRACT

Ingest health monitoring includes receiving an event stream of events to store on at least one storage system and obtaining an event from the event stream. Ingest health monitoring further includes transmitting the event to a selected ingest module queue for the event, updating an output rate indicator counter for the selected ingest module queue when failure to store the event in the ingest module queue occurs, obtaining the event from the selected ingest module queue, processing the event to generate a file for the event, and transmitting the file to the at least one storage system. Ingest health monitoring further includes updating the write failure indicator counter for a storage system of the at least one storage system when failure to transmit to the storage system occurs and updating the user interface based on the output rate indicator counter and the write failure indicator counter.

20 Claims, 16 Drawing Sheets

```
06-29-2022 11:35:13.492 -0700 INFO PeriodicHealthReporter - feature="Ingest Actions Output S3" color=red
due_to_stanza="feature:ingest_actions_output" due_to_indicator="write_failure" node_type=feature
node_path=splunkd.data_forwarding.ingest_actions_output_s3
06-29-2022 11:35:13.492 -0700 INFO PeriodicHealthReporter - feature="Ingest Actions Output S3" color=red indicator="write_failure"
due_to_threshold, value=10 measured_value=10 reason="The number of consecutive failures to write data to destination S3 exceeds
the red threshold, reason="HTTP Error 403: Forbidden". This typically occurs with incorrect access/secret keys, incompatible bucket
policies or bad network connectivity." node_type=indicator
node_path=splunkd.data_forwarding.ingest_actions_output_s3.write_failure
710
```

FIG. 7

```
[feature:ingest_actions_output]
display_name = Ingest Actions Output
friendly_description = Indicates whether Ingest Actions is able to successfully route data to external
destinations.

indicator:output_rate:friendly_description = Indicates that Ingest Actions is able to insert data into Splunk's
processing queue.
indicator:output_rate:description = This indicator reflects the number of consecutive times the rfsoutput
processor was unable to insert data into Splunk's processing queue. By default, this indicator becomes Yellow
after consecutive insertion failures for 5 seconds, and Red after 10 seconds. Setting both thresholds to 0 will
disable this indicator.
indicator:output_rate:yellow = 5
indicator:output_rate:red = 10 indicator:write_failure:friendly_description = Indicates that Ingest Actions is able to write data to external
destinations successfully.
indicator:write_failure:description = The indicator reflects the number of consecutive times the rfsoutput worker
was unable to write data into external destinations. By default, this indicator becomes Yellow after 2
consecutive write failures, Red after 10 consecutive failures. Setting both thresholds to 0 will disable this
indicator.
indicator:write_failure:yellow = 2
indicator:write_failure:red = 10
tree_view:health_subset = enabled
```
810

```
curl -k -u admin:pass https://<host>:<mPort>/services/server/health-config/feature:ingest_actions_output -d
disabled=1
```
820

```
curl -k -u admin:pass https://<host>:<mPort>/services/server/health-config/_reload
```
830

FIG. 8

INGEST HEALTH MONITORING WITH FAILURE INDICATOR

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Modern enterprise systems often comprise thousands of hosts that operate collectively to service requests from even larger numbers of remote clients. During operation, components of these enterprise systems can produce significant volumes of machine-generated data. As the number of hosts and clients associated with a data center continues to grow, processing large volumes of machine-generated data in an intelligent manner and effectively presenting the results of such processing continues to be a priority.

In order to use the volumes of machine-generated data, the machine-generated data is transmitted from the components that produce the data to a data intake and query system. The data intake and query system index the machine-generated data and then store the machine generated data.

BRIEF DESCRIPTION OF THE DRAWINGS

Illustrative examples are described in detail below with reference to the following figures:

FIG. 7 illustrates an example health report log entry.

FIG. 8 illustrates an example for user to define configuration of the health report.

DETAILED DESCRIPTION

Components of enterprise systems can produce significant volumes of machine-generated data in the form of events. An event is a discrete portion of machine data that is associated with a timestamp. The events are transmitted by forwarders to indexers where the events are indexed and then stored on one or more storage systems. In the process of storing events, failures may occur. For example, the indexer may not be able to keep up with the rate at which events are being received from the enterprise system, or failure may occur in transmitting events to the storage system. A challenge exists in identifying when such failures occur.

Further, once stored, the events may be queried for performing analytics on the data center. Large volumes of events are generated and stored. As the number of files grows over time, retrieval of events for a timestamp range involves a probing of file names and folders in a bucket, which may not be scalable. Further, having a single storage system for all events may not be scalable when querying the storage system for events.

The present disclosure includes a system that routes events to different storage systems. During routing, each storage system has an individual set of rules defining the type of events to be stored on the storage system, the directory structure of the storage system, and the partitioning of the storage system. The system implements routing events to the one or more storage systems and then implements the rules for the respective storage system. Specifically, the system stores the events in the respective storage system in accordance with the respective rules. Further, the system maintains the location information of the events on the respective storage system. Thus, the system implements a simple and flexible scheme that partitions events and stores the partitions in a directory structure that encodes the scheme.

With respect to failure detection, the system has indicators injected in the respective portions of the system to track whether the system is able to process the events at the rate that the events are being received. During execution, when a failure occurs in transmitting the event to a queue or sending the event to the storage system, the respective indicator is updated. Alerts may be displayed or transmitted when the respective indicator indicates a failure in the system.

Figure 1:
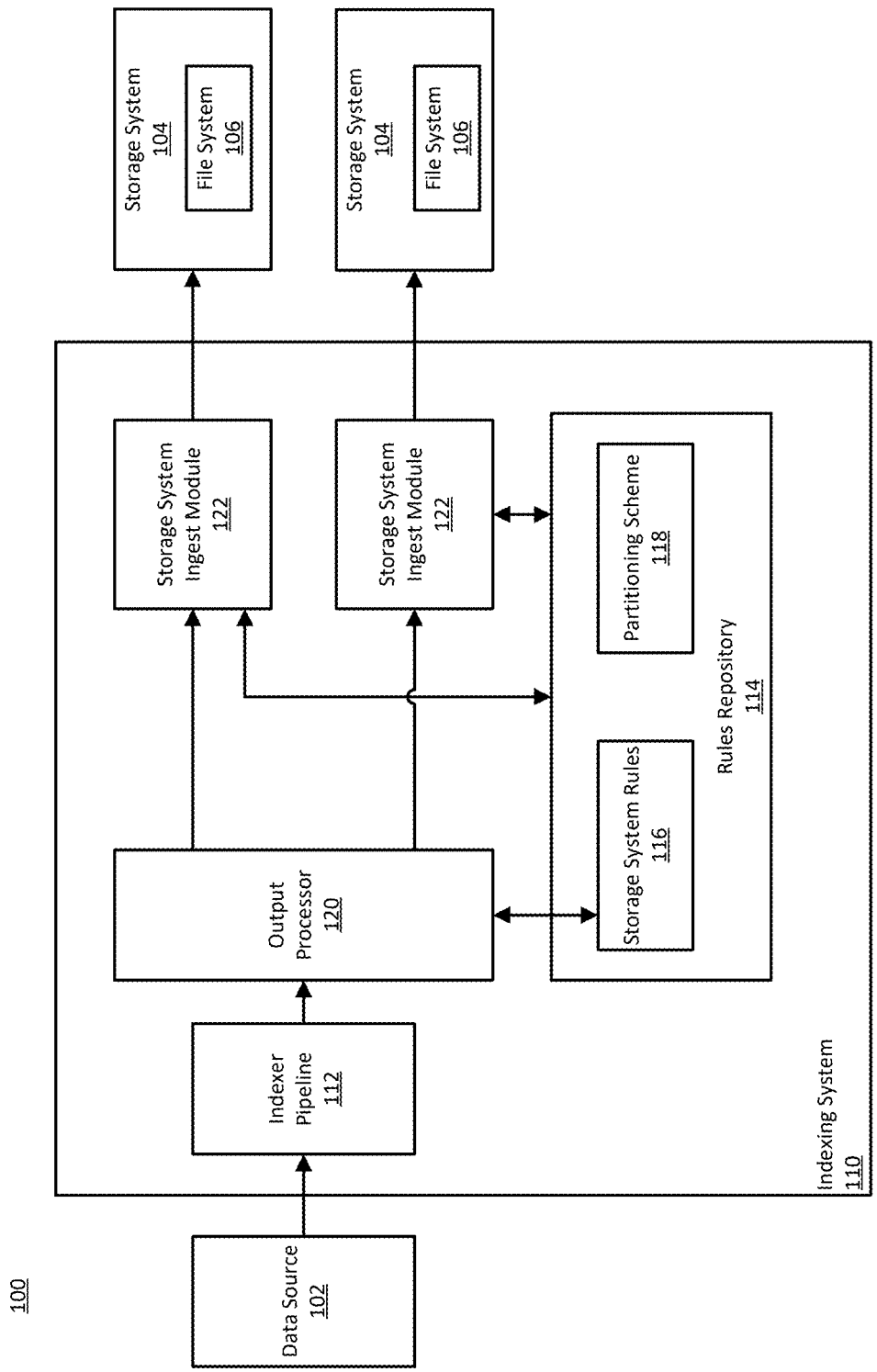
FIG. 1 illustrates an example diagram of a network computer environment.

FIG. 1 illustrates an example diagram of a network computer environment. As shown in FIG. 1, the system 100 includes a data source 102 connected to an indexing system 110. The indexing system 110 is connected to storage systems 104. The data source 102 is one or more of the data sources described below with reference to FIG. 13 and FIG. 14. As discussed in reference to FIG. 13, multiple data sources may be connected to the data intake and query system. Each data source directly or indirectly transmits events to the indexing system 110. The indexing system 110 is an implementation of the indexing system described in reference to FIG. 13 and FIG. 14.

The indexing system 110 is a system configured to receive an event stream, index the events for storage and retrieval, and send the events to a storage system 104. The storage system is a system that directly stores the events. Namely, a storage system is a destination for events. For example, the storage system may be provided by a third-party storage vendor. The multiple storage systems may be from different vendors and thereby heterogenous. The heterogeneous storage systems may have heterogeneous protocols and interfaces for storing data on the storage system. Some of the storage systems may be from the same vendor and of the same type. Further, some of the storage systems may have the same or overlapping physical devices. The actual physical device and underlying storage may be abstracted from the indexing system.

Each storage system 104 includes a file system 106 having a directory structure. The directory structure is a file system hierarchy, whereby files are contained in respective folders. A folder may be contained in other folders as in a tree structure. Events may be stored in files in the file system 106 as raw machine data. For example, events may be stored in sequential order in the files. By way of a further example, events may be stored in timestamp order in the file, whereby events that have a later timestamp are after events having an earlier timestamp. The file size of each file is defined by a predefined rule. For example, the rule may be a time threshold or size threshold. When the predefined rule is satisfied, the file is stored, and a new file is created for subsequent events. Thus, multiple files may be stored in the same leaf folder in the file system 106.

Files in the file system have a location that is addressable by a uniform resource locator (URL). The location is defined by a pathname to the file in the file system 106 according to the directory structure with the filename of the file. The pathname includes the path to the storage system as well as the path within the storage system to the file. In one or more embodiments, the filename has the following format:

events_{LT}_{ET}_{file_create_epoch}_{seq_num}_ {peer_guid}, {ext}

In the above file format, LT is the latest timestamp in the file (e.g., the timestamp of the last event, in chronological order, in the file. ET is the earliest timestamp in the file (e.g., the timestamp of the first event, in chronological order, in the file). The Epoch is the file create time in sequential order. The seq_number is a sequence number of the file in the order of the files in order to avoid collisions in file names potentially caused by recurring pattern of timestamps when ingested from multiple sources. The peer_guid is the globally unique identifier of the instance of the indexing system that uploaded the file. Further, ext defines the filetype, such as JAVASCRIPT Object Notation (JSON). Other filetypes may be used without departing from the scope of the claims. An additional extension may optionally exist if compression is performed. The additional extension identifies the compression.

File systems 106 may have heterogeneous directory structures. Namely, the partitioning scheme implemented by the directory structure may vary amongst the storage system. Partitioning is the grouping of files into folders and the grouping of subfolders into other folders. Partitioning schemes are different when the reason for separating at least two folders or at least two files are different.

The directory structure for a file system 106 is defined by a partitioning scheme 118. A partitioning scheme 118 includes a partitioning scheme name and the set of partitioning rules. The partitioning scheme name is a unique identifier of the partitioning scheme 118. The set of partitioning rules for the partition scheme defines how the events are partitioned into files and how files are partitioned into folders. The partitioning rules specify a partition based on fields of the events being stored on the storage device.

For example, the partitioning rules may specify a hierarchy of fields for grouping events. At the top level of the hierarchy, all events are partitioned into groups. At subsequent levels, each group is individually partitioned into subgroups. At each level of the hierarchy, a group of events are partitioned into subgroups according to the field values of the events. The grouping may be exact (e.g., a same field value is grouped into the same subgroup and different field values are in separate subgroups) or based on ranges or sets (e.g., field values in the same range or defined set are grouped into a subgroup and in different ranges or sets are grouped into different ranges or sets). The following are examples of partitioning schemes for partitioning events based on timestamp and source type of the data source.

In a first partitioning scheme, the partitioning scheme partitions events using portion of the event timestamp. For example, the partitioning may be based on year. In such an example, each year is in a different folder of the file system 106. The full pathname to the location of the file (i.e., path to the leaf folder) may include the "<pathname to the file system>/year=<yyyy>", where yyyy is the year in the event timestamp in the partition. As shown, events in the same year are in the same folder and events in the different years are in different folders. The remainder of the timestamp may be ignored.

In a second example, the partitioning scheme is based on month. In such an example, the full pathname to the location of the file having events include the "<pathname to the file system>/year=<yyyy>/month=<mm>", where yyyy is the year in the event timestamp in the partition and mm is the month in the event timestamp. Therefore, events in the same year are in the same folder, then events in the same month are grouped in the same subfolder of the corresponding year folder while events in the different years and different months are in different folders and subfolders.

In a third example, the partitioning scheme is based on day. In such an example, the full pathname to the location of the file having the events grouped in a partition may include the "<pathname to the file system>/year=<yyyy>/month=<mm>/day=<dd>", where yyyy is the year in the event timestamp in the partition, mm is the month in the event timestamp, and dd is the day in the event timestamp. Therefore, events in the same year are in the same folder, then events in the same month are grouped in the same subfolder of the corresponding year folder, and then events on the same day are grouped into the same subfolder of the corresponding month folder. Events in years, months, and days are in different folders and subfolders.

Partitioning may be based on the source type of the data source. For example, any of the above day, month, or year example partitioning schemes may further partition events based on the source type. The source type may precede or succeed the above partitioning. For example, if the source type is added after month, then the full pathname to a particular file may be "<pathname to the file system>/year=<yyyy>/month=<mm>/sourceType=<st>", where yyyy is the year in the event timestamp in the partition, mm is the month in the event timestamp, and st is the unique source type identifier of the data source of the event. A similar adding of source type may be performed for the above day and year examples. Further, other fields may be used to partition events.

In the above example, each slash ("/") represents a different level of the hierarchy for partitioning and of the directory structure. Within a leaf folder (i.e., at the lowest level of the directory structure), events may be in different files based on timestamp and other rules. The URL for a file uniquely identifies the location of the file and includes the path to the file.

Multiple partitioning schemes may exist, whereby each partitioning scheme may have a heterogeneous set of partitioning rules amongst the partitioning schemes. Partitioning schemes may be defined for a specific storage system or may be adopted by one or more storage systems. A default partitioning scheme may also exist and be used when a partitioning scheme is not specified for the storage system. Thus, for example, one storage system may use a partitioning scheme that partitions events only based on day while another storage system uses a partitioning scheme that partitions events based on month and source type.

The indexing system stores storage system rules 116. Generally, a storage system rule defines the location of the storage system, security certificates to store events, the set of events to route to a particular storage system, compression, access parameters, partitioning scheme, and other properties to store events on the storage system. Different mechanisms may be used to define storage system rules 116. For example, in one mechanism, each storage system has an individual set of storage system rules that are uniquely defined for the storage system.

In another example mechanism, system storage rules are grouped into rulesets. A ruleset has a ruleset name and ruleset properties. The ruleset properties may include a partitioning scheme (discussed above), whether to drop events when an error occurs, a threshold file size for when to create a new file, a threshold timeout for when to create a new file, a compression method identifier of a compression method to apply, and a compression level for the compression method. A default ruleset may exist that defines default ruleset properties. The individual default ruleset properties may be overwritten by custom rulesets. Thus, if a custom ruleset does not identify a particular property, the default ruleset property is applied. The ruleset properties include a ruleset name that is referenced by a conditional statement.

The conditional statement identifies the condition to apply a ruleset identified by a particular ruleset identifier, and a storage system identifier of one or more storage systems. The conditional statement may be all events or condition on a subset of events based on the field values of the events. For example, the conditional statement may specify that the events from a particular source type are to have a particular ruleset applied and be routed to one or more storage systems identified by a corresponding storage system identifier. As another example, the conditional statement may identify a particular range of field values, a particular event type, a particular role of a user, or other field values.

The storage system rules 116 also includes connection parameters for each storage system referenced by a storage system identifier for the storage system. In the rules repository, storage systems have storage system identifiers and connection parameters. The storage system identifier is the unique identifier of the storage system referenced in the conditional statement. The corresponding connection parameters for a storage system include pathname to the storage system, security certificates, and other properties to store and retrieve data from the storage system.

The storage system rules 116 and partitioning scheme 118 are stored in a rules repository. The rules repository 114 is a data repository that stores rules. In general, a data repository is a storage unit or device that stores data. For example, a data repository may be a data structure, a file, a collection of files, memory, hardware, etc. The data repository may include multiple storage units or devices, which may be heterogeneous in type or distributed. Various different types of data repositories exist, and the rules repository 114 may be implemented as any of the types.

Through the storage system rules 116 and the partitioning rules 118, the rules repository creates a flexible and adaptable mechanism to define heterogeneous file systems 106 having different sets of events routed to each heterogeneous file system. Thus, each storage system 104 may be defined for a particular type of storage and retrieval of data. By having heterogeneous storage systems with flexible storage, the storage may be optimized based on the type of analytics to be performed on the data in the storage system. For example, using one storage system, data analytics may be performed to detect anomalies by a user as compared to groups of users. In such a scenario, events may be partitioned in the storage system based on the roles of the user. In another storage system, data analytics may be performed to detect failures. In such a scenario, the storage system may partition events based on days and have a rule that deletes old logs.

In addition to the rules repository 114, the indexing system 110 includes an indexer pipeline 112, an output processor, and a storage system ingest module 122. The indexer pipeline 112 performs various processing actions to index events. For example, the indexer pipeline may parse the event, transform one or more fields of the event, change the datatype of the event, change received data from header and data for multiple events to key-value pairs for each event, aggregate multiple events into a single event, and perform other operations related to indexing.

The indexer pipeline 112 transmits processed events to an output processor 120. The output processor 120 reads each event and transmits the events to the storage system ingest module based on applying the storage system rules 116. Specifically, the output processor executes the conditional statements in the storage system rules 116 to determine which one or more storage systems should receive the events. A single event may be transmitted to a single storage system or more than one storage system.

An individual storage system ingest module 122 exists for each storage system 104. For example, a storage system ingest module 122 output to a single storage system. A one-to-one mapping may exist between storage system ingest modules 122 and storage systems 104. The storage system ingest module 122 performs partitioning, generating a file with events in a partition, generating a path URL for the file, compression, and transmitting the file to the storage system 106. The storage system ingest module 122 uses the storage system rules 114 and the partitioning scheme 118 to perform the various actions. A storage system ingest module 122 is described in FIG. 2 below.

Although only two storage system ingest modules 122 and storage systems 104 are shown, any number of storage system ingest modules 122 and storage systems 104 may exist. Similarly, for any of the components shown in FIG. 1, multiple instances of the component may exist, such as to increase system throughput.

Figure 2:
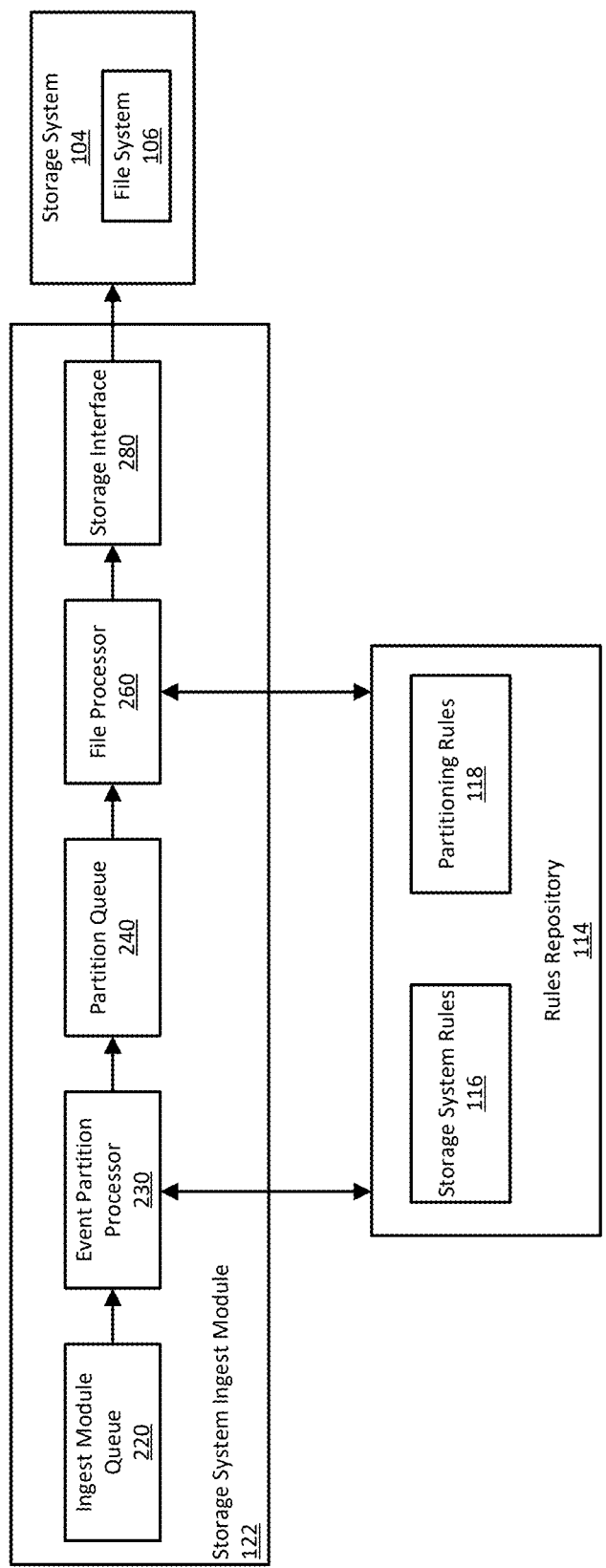
FIG. 2 illustrates an example diagram of a portion of an indexing system for multiple storage systems.

FIG. 2 illustrates an example diagram of a portion of an indexing system for multiple storage systems. In FIG. 2, the rules repository 114 with storage system rules 116 and partitioning rules 118 and the storage system 104 with the file system 106 are the same as the like-named components described above in FIG. 1. Although a single storage system ingest module 122 is shown in FIG. 2, the components of the storage system ingest module in FIG. 2 may be in each of the storage system ingest modules in FIG. 1.

The storage system ingest module 122 includes an ingest module queue 220, an event partition processor 230, a partition queue 240, a file processor 260, and a storage interface 280. The ingest module queue 220 is a queue configured to receive events targeted at the storage system 104 for processing by the storage system ingest module 122. The ingest module queue 220 may be a first in first out (FIFO queue), whereby events are temporarily stored in the queue and are removed from the queue in the order in which the events are received in the queue.

The event partition processor 230 is configured to implement the partitioning scheme of the storage system 104. Specifically, the event partition processor 230 obtains the partitioning rules 118 for the storage system 104 and implements the partitioning rule. The event partition processor 230 is connected to a partition queue 240. The partition queue 240 has a separation between events of different partitions. For example, the partition queue 240 may have individual sub-queues for partitions of events currently being processed. Thus, events in the partition queue are organized by partition. Within each partition, the events are ordered in timestamp order. The event partition processor 230 is configured to determine, for each event, based on the field values of the event, whether the event should be added to an existing sub-queue in the partition queue based on whether the event is in the same partition as events in an existing sub-queue. If not, the event partition processor 230 creates a new sub-queue for the event. The event partition processor 230 may have multiple threads that are concurrently processing events in the ingest module queue 220 and adding events to the partition queue 240.

The file processor 260 is configured to iterate through the partition queue 240 and evict sub-queues according to the storage system rules 116. For example, the file processor 260 may evict sub-queues that have a number of events that satisfy the threshold file size for when to create a new file or that have an elapsed time since the first event added which satisfies the threshold timeout for when to create a new file. The file processor 260 creates a new file having the events in a single sub-queue. Namely, the events in the sub-queue that is evicted are grouped into a file. The file processor is further configured to perform compression on the file according to the compression method identifier and the compression level. The file processor 260 further generates the URL to the file and initiates the upload to the storage system 104. Generating the URL includes determining the partition for the file and generating a file name for the file based on the events in the file. Generating the URL includes a pathname for the storage device to the pathname to the file based on the partition and adding the file name of the file. The file processor may include multiple threads that concurrently and asynchronously generates and transmits files.

The storage interface 280 uses the storage system rules 116 to transmit the file to the storage system 104. For example, the storage interface 280 may transmit files to the storage system in accordance with the storage credentials. The storage interface 280 also provides the location for storing the file in the file system 106.

At various stages in the ingesting of events, failure may occur. The indexing system 110 may include components for performing health monitoring. The health monitoring may check for cases in which the indexing system cannot keep up with the events being received and for cases in which the events are not being stored on the storage system.

Figure 3:
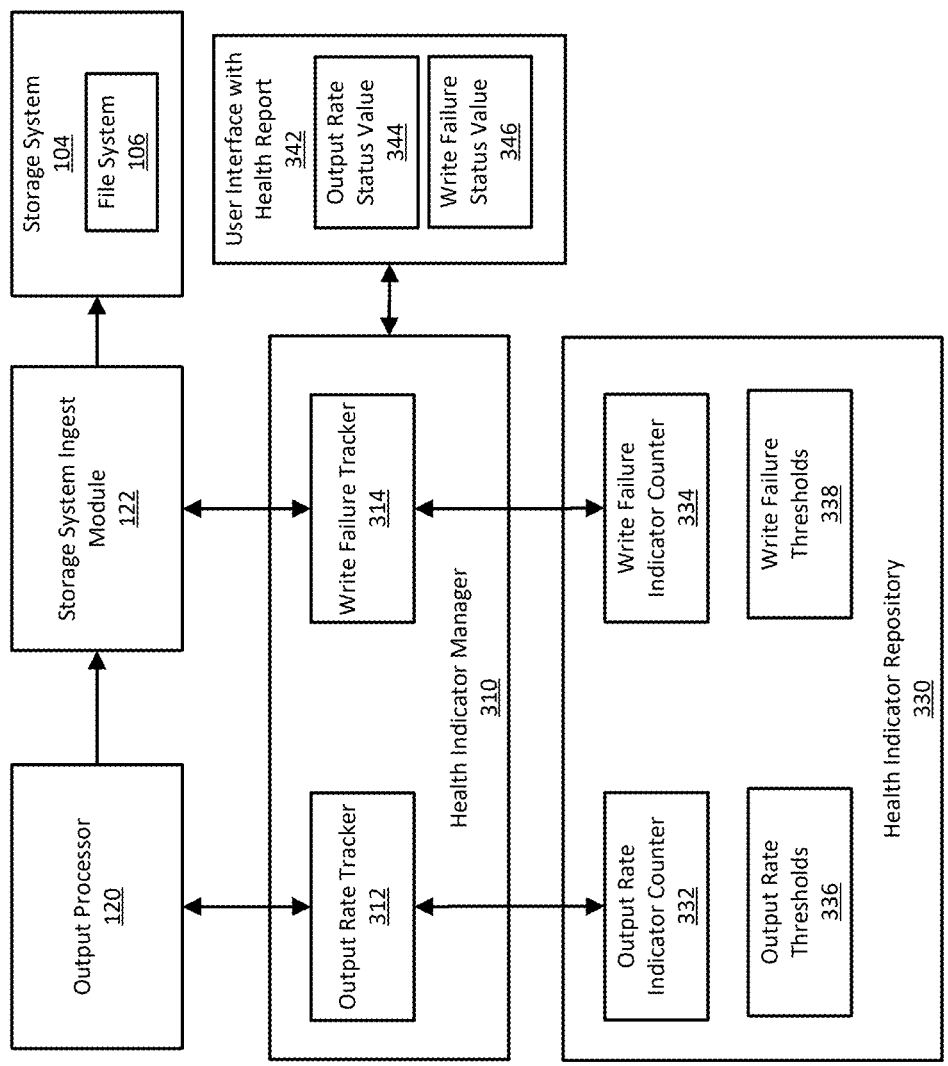
FIG. 3 illustrates an example diagram of a portion of an indexing system for health monitoring.

FIG. 3 illustrates an example diagram of a portion of an indexing system for health monitoring that is connected to a storage system 104 having file system 106. The output processor 120 and storage system ingest module 122 are the same as described above with reference to FIG. 1. The system also includes a health indicator repository 330, which is a data repository that stores health indicator values. The health indicator repository 330 is configured to store an output rate indicator counter 332, output rate thresholds 336, write failure indicator counter 334, and write failure thresholds 338.

The output rate indicator counter 332 is a counter that tracks when the rate of processing events is exceeded by the rate in which events are received. The output rate indicator counter 332 is an indicator in that the output rate counter does not directly compute whether the rate of processing is greater than the rate of events being received. The cause of the exceeding may be because the events are too slow in being processed or because events are being received too quickly. For example, the output rate indicator counter 332 may store the number of times in which a write to a queue fails because of the queue being full. The output rate indicator counter in some examples stores a value indicating a number of consecutive times of failure. Thus, success may reset the counter. Other triggers may exist that reset the counter.

The output rate indicator counter 332 is associated with one or more output rate thresholds 336. Each output rate threshold 336 is associated with an output rate status value 344. The output rate status value 344 specifies the determined health of the system. By way of an example of two output rate thresholds (e.g., warning output rate threshold, error output rate threshold), the output rate indicator counter being below both thresholds may be a healthy output rate status value. Namely, the rate of events being received is generally the same or less than the rate at which events are being processed. The output rate indicator counter 332 being above a warning output rate threshold and below an error output rate threshold causes the output rate status value to be in a warning status. The output rate indicator counter 332 being above the error output rate threshold indicates that the output rate status value is in an error mode (e.g., unhealthy because of having many failures).

The write failure indicator counter 334 is a counter that tracks failure when writing to the storage system 104 occurs. The cause of the failure may be, for example, a disconnection, a problem on the storage system side, an error in the connection parameters, or another reason. The write failure indicator counter in some examples stores a value indicating a number of consecutive times of failure. Thus, success may reset the counter. Other triggers may exist for resetting the counter.

The write failure indicator counter 334 is associated with one or more write failure thresholds 338. Each write failure threshold 338 is associated with a write failure status value 346. The write failure status value 346 specifies the determined health of the system. By way of an example of two write failure thresholds (e.g., warning write failure threshold, error write failure threshold), the write failure indicator counter being below both thresholds may be a healthy write failure status value 346. Namely, files are generally capable of being stored on the storage system 104. The write failure indicator counter 334 being above a warning write failure threshold and below an error write failure threshold causes the write failure status value 346 to be in a warning status. The write failure indicator counter 334 being above the error write failure threshold indicates that the write failure status value is in an error mode (e.g., unhealthy as having many failures).

The health indicator manager 310 is software that updates the respective thresholds and is configured to generate a health report for display in the user interface 342. The health indicator manager 310 includes an output rate tracker 312 and a write failure tracker 314. The output rate tracker 312 is configured to update and reset the output rate indicator counter 332. The write failure tracker 314 is configured to update and reset the write failure indicator counter 314.

The user interface with the health report 342 is a graphical user interface having a health report that presents the health status of the indexing system using the health status indicator counters. In some cases, the user interface is may display information at various levels of granularity. At the highest level of granularity, the worse of the output rate status value and the write failure status value is displayed. At the next level of granularity, both statuses are displayed. At the next level of granularity, the status is displayed on a per storage system basis. In each case, information may be presented as to the reasons for the status. For example, the reason may include the value of the respective counter, the value of the thresholds, the time, and a brief description as to what may have caused the status.

Figure 4:
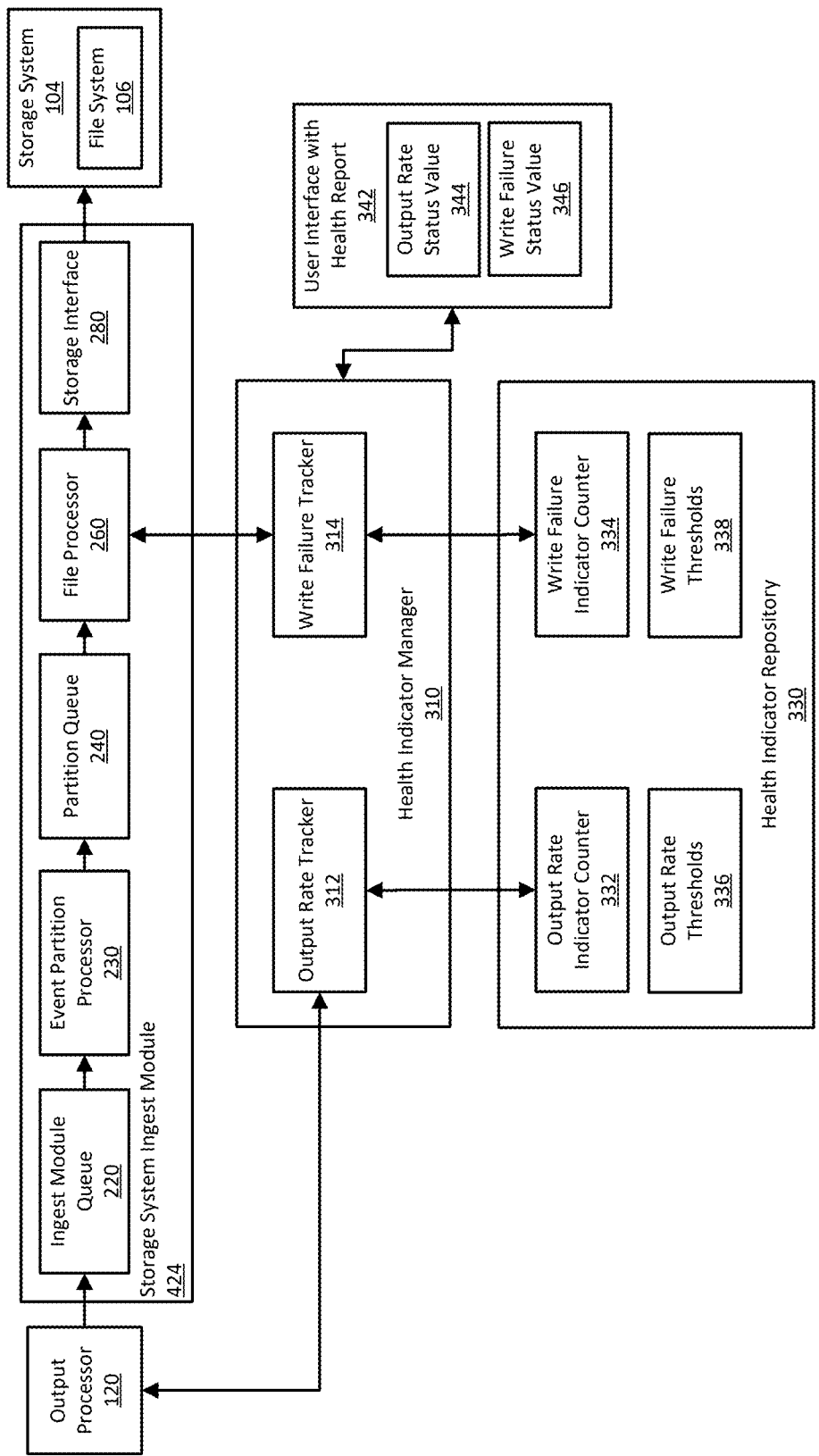
FIG. 4 illustrates an example diagram of a portion of an indexing system for health monitoring.

Turning to FIG. 4, FIG. 4 illustrates an example diagram of a portion of an indexing system for health monitoring. Like numbered components of FIG. 4 as in FIGS. 1-3 are the same as in FIG. 1-3. As shown in FIG. 4, the storage system ingest module 424 is substantively the same as the storage system ingest module 424 discussed above with reference to FIG. 2 but includes additional functionality for health monitoring.

As shown in FIG. 4, the output processor 120 is configured to detect a failure in writing an event to the ingest module queue 220 and transmit an update indicating the failure to the output rate tracker 312. The output rate tracker 312 is configured to update the output rate indicator counter 332. In some examples, the counter counts consecutive failures. Thus, if a success of writing to the ingest module queue 220 follows a failure, the output processor 120 is configured to send the success notification to the output rate tracker 312, which resets the output rate indicator counter 332.

The file processor 260 is configured to detect a failure in writing a file to the storage system 104 and send a notification of the failure to the write failure tracker 314. The write failure tracker 314 is configured to update the write failure indicator counter 334. In some examples, the counter counts consecutive failures. Thus, if a success of writing to the storage system 104 follows a failure, the file processor 260 is configured to send the success notification to the write failure tracker 314, which resets the write failure indicator counter 334.

Figure 5:
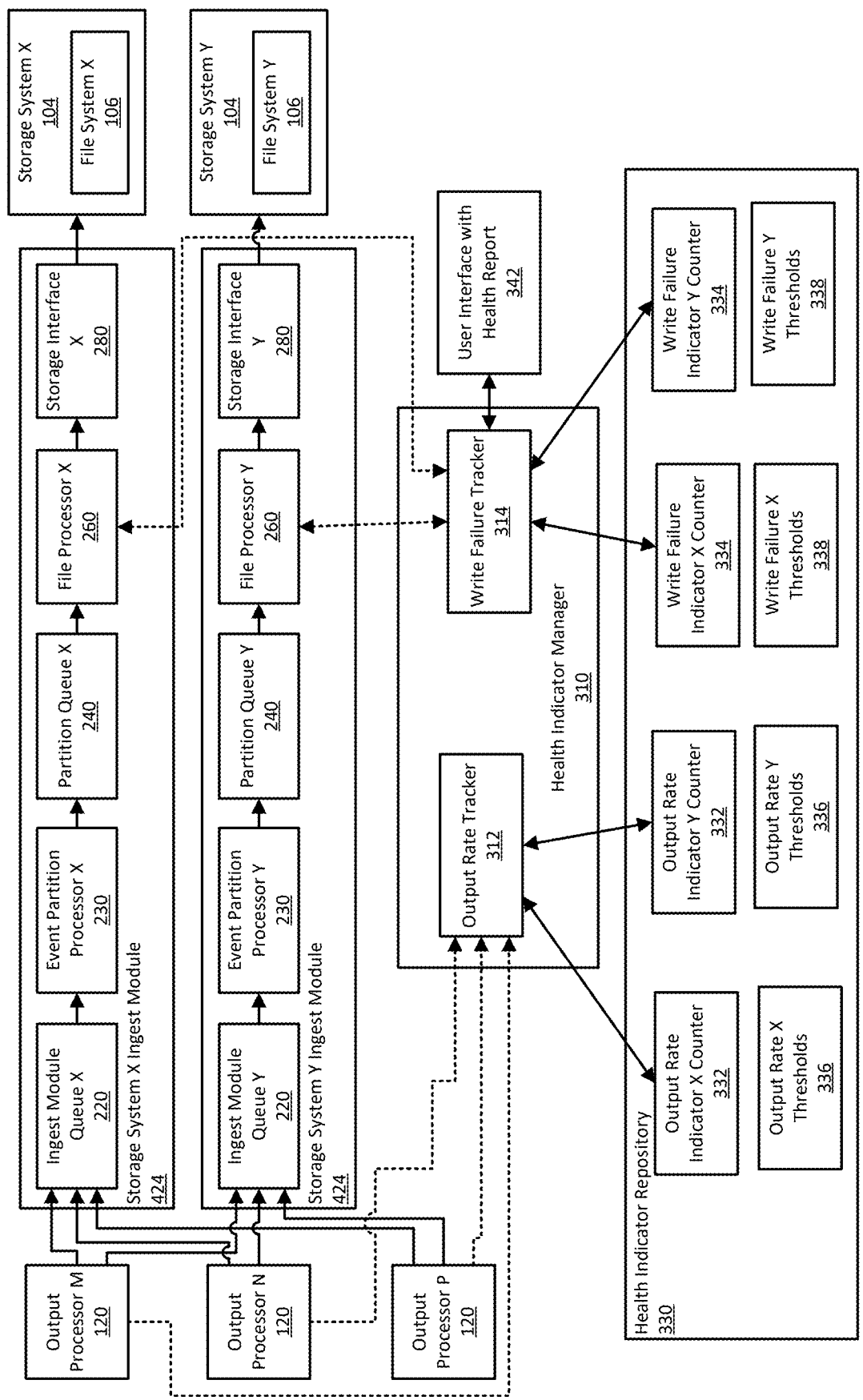
FIG. 5 illustrates an example diagram of a portion of an indexing system for health monitoring in a multiple storage system environment.

FIG. 5 illustrates an example diagram of a portion of an indexing system for health monitoring in a multiple storage systems environment. Like numbered components of FIG. 5 as in FIGS. 1-4 are the same as in FIG. 1-4.

As shown in FIG. 5 and described in reference to FIG. 2, multiple storage system ingest modules 424 may exist, whereby an individual storage system ingest module 424 exists for each storage system 104. Each storage system ingest module 424 and storage system 106 has a corresponding set of counters that are unique to the storage system ingest module. In some examples, the thresholds are also unique. For example, storage system X ingest module and storage system X has output rate indicator X counter 332, output rate X thresholds 336, write failure indicator X counter 334, and write failure X thresholds 338. Similarly, in the example, storage system Y ingest module and storage system Y has output rate indicator Y counter 332, output rate Y thresholds 336, write failure indicator Y counter 334, and write failure Y thresholds 338. Because the storage system ingest module X is unique and has a unique set of counters, the corresponding file processor, including the various threads therein, causes an update to a single write failure indicator counter.

Continuing with FIG. 5, output processors are in a mapping to indexer pipelines 112 (shown in FIG. 1). For example, the mapping between output processors and indexer pipelines may be one-to-one. The number of indexer pipelines may be defined based on the number of events being processed by the system, such as to manage throughput. Thus, multiple output processors 120 may exist whereby each output processor may write events to any of the ingest module queues 220. Thus, for example, output processor P 120 may write to ingest module queue X 220 and ingest module queue Y. Thus, a single output processor may cause an update to the multiple output rate indicator counters 332. When an output processor 120 sends an update to the output rate tracker 312, the output processor 120 includes a direct or indirect identifier of the output rate indicator counter to be updated. Thus, the output rate tracker 312 can update the corresponding counter based on the failure to write to the corresponding ingest module queue 220.

The user interface with the health report 342 may present the overall health of the system, such as by presenting the worse health status as well as the health of individual components of the system.

Figure 6:
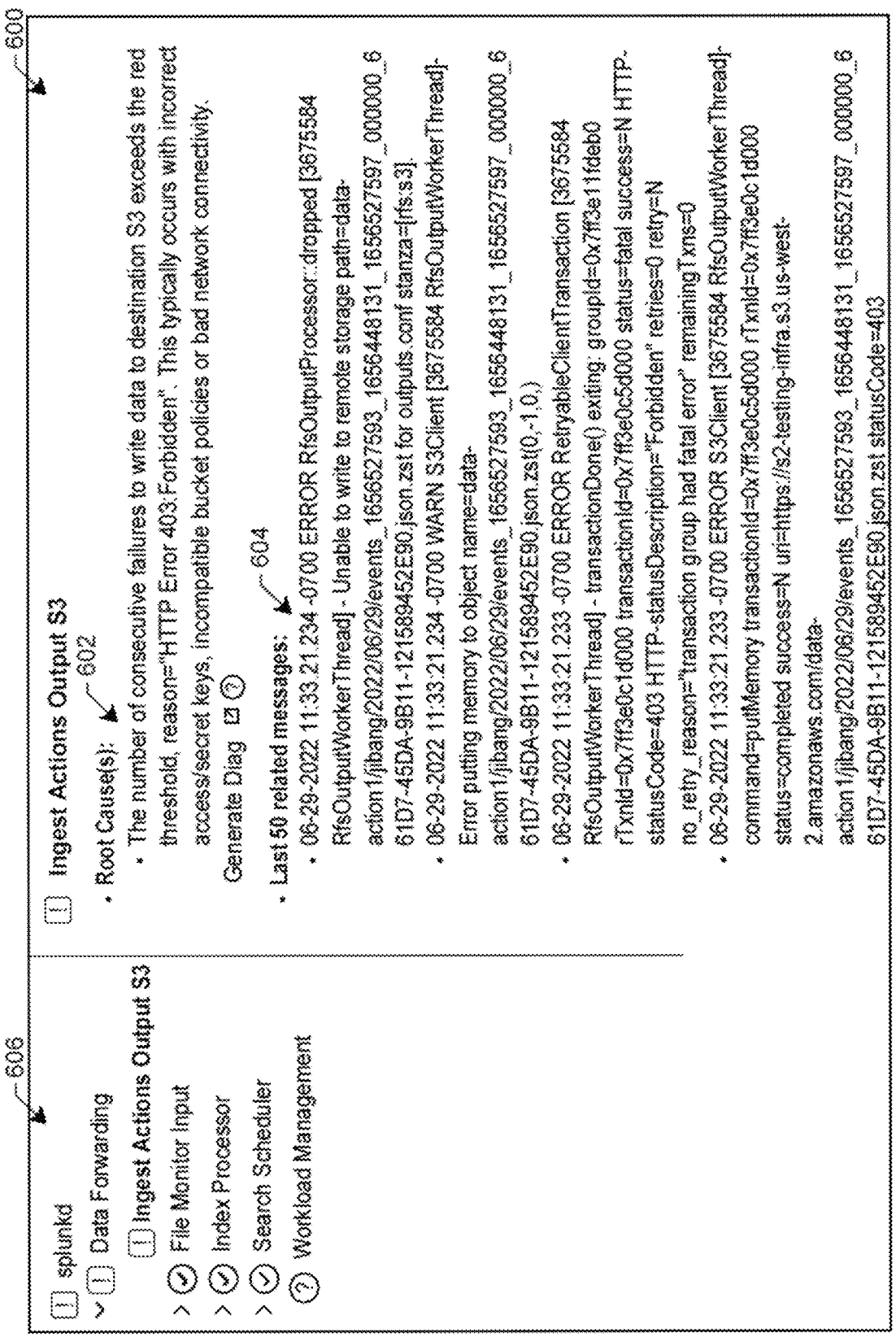
FIG. 6 illustrates an example interface for a health report.

FIG. 6 illustrates an example interface for a health report 600. In the example health report, color coding is used for the health status. For example, the color green may be used to indicate a healthy system, the color yellow may be used to indicate a warning, and the color red may be used to indicate an error. In the example, a yellow threshold is a first threshold for warning and a red threshold is a higher second threshold indicating an error.

In the example, ingest actions output S3 is an aggregation of the write failure indicator and the output rate indicator for S3, where S3 is a storage system. As shown in the root causes section 602 of the health report 600, the ingest actions output S3 counter is greater than the red threshold. The health report 600 also includes a possible reason for the failure, namely, that an incorrect access or secret keys may be used, incompatible bucket policies, or bad network connectivity. By reviewing the health report, an administrator may identify the failure and adjust the system to respond to the failure. The health report may also include a related messages section 604 that lists messages from the file processor to the write failure tracker.

The left pane 606 includes other features of the user interface for managing the data intake and query system.

If multiple output rate indicator counters exist or multiple write failure indicator counters exist, the user interface may prioritize the health report to focus on the indicator with the worst health status.

The health report of FIG. 6 is not the only way to record the health status. FIG. 7 illustrates an example health report log entry 710. The example log entry 710 includes the date and time of the threshold being exceeded, the name of the write failure indicator counter that exceeded the threshold, the value of the counter, the value of the threshold, a reason, and other information. The log entry may be stored in a log for tracking and analytics purposes. For example, the log entry may be used by the system to perform self-healing of the system.

The indicators and thresholds are configurable. FIG. 8 illustrates an example for a user to define the configuration of the health indicator monitor. For example, the user may define parameters of the write failure indicator, including a display name, a description, a red threshold, and a yellow threshold as shown in box 810. The user may provide the same information for the output rate indicator as shown in box 810.

The command in box 820 may be used to enable or disable health monitoring. Further, the command in box 830 may be used to reload the thresholds.

FIGS. 9-12 illustrate example processes. The example process can be implemented, for example, by a computing device that comprises a processor and a non-transitory computer-readable medium. The non-transitory computer readable medium can be storing instructions that, when executed by the processor, can cause the processor to perform the operations of the illustrated processes. Alternatively, or additionally, the processes can be implemented using a non-transitory computer-readable medium storing instructions that, when executed by one or more processors, cause the one or more processors to perform the operations of the processes.

Figure 9:
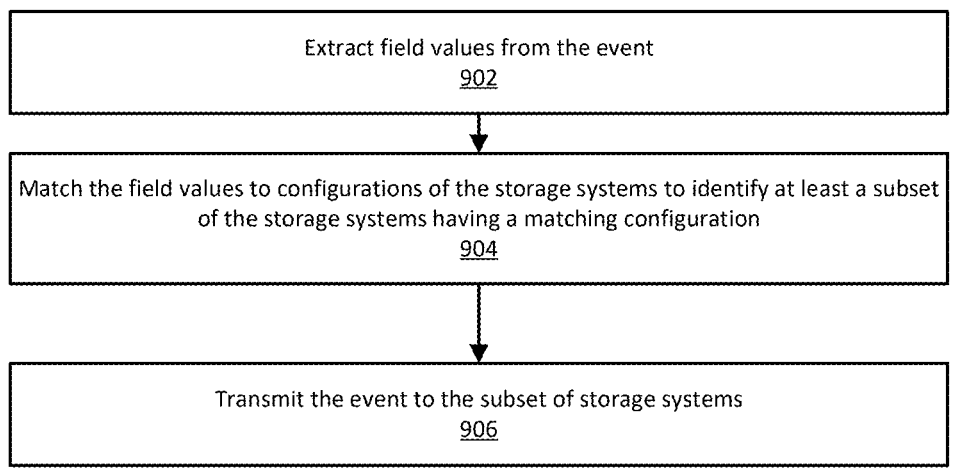
FIG. 9 illustrates an example process for transmitting events to multiple storage systems.
Figure 10:
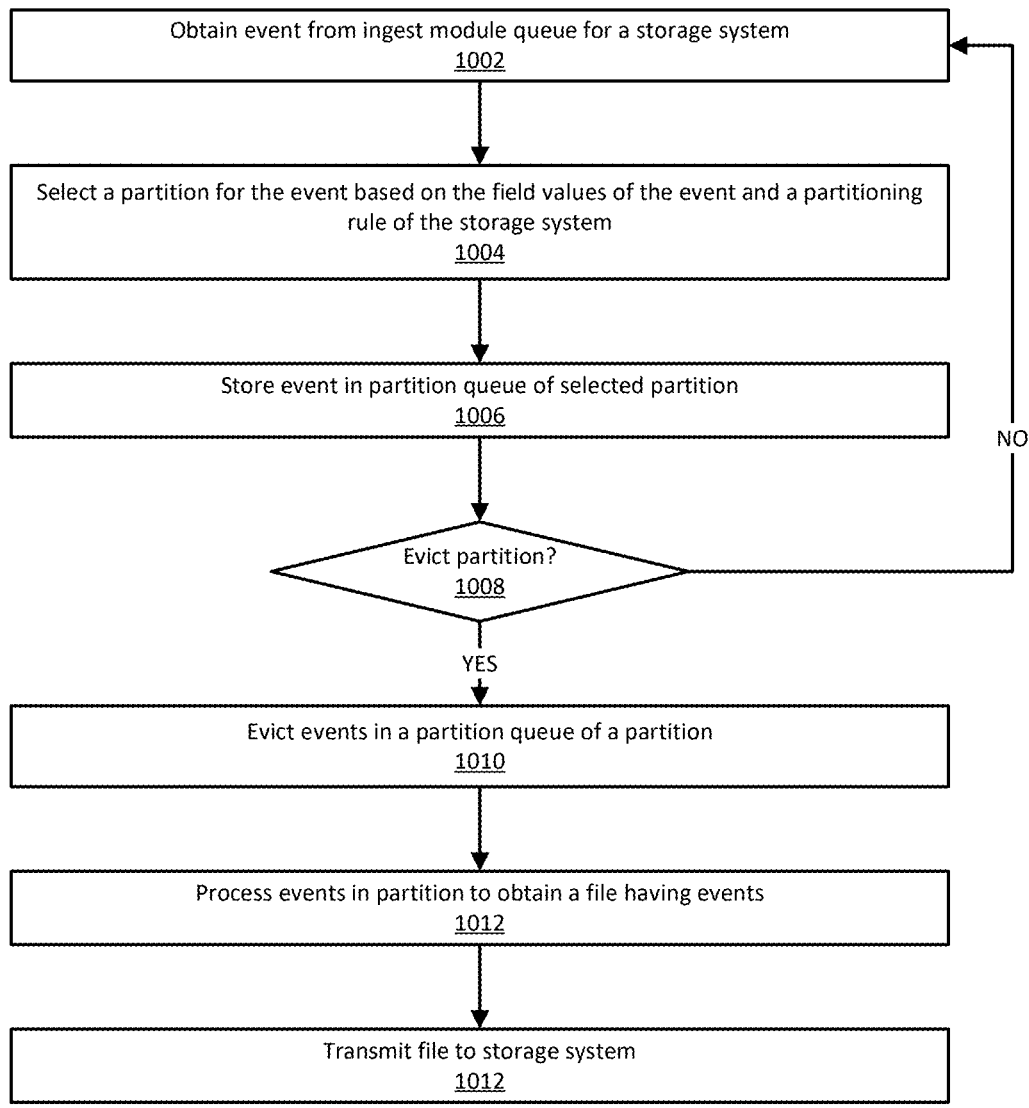
FIG. 10 illustrates an example process for processing by a storage system ingest module to transmit events.
Figure 11:
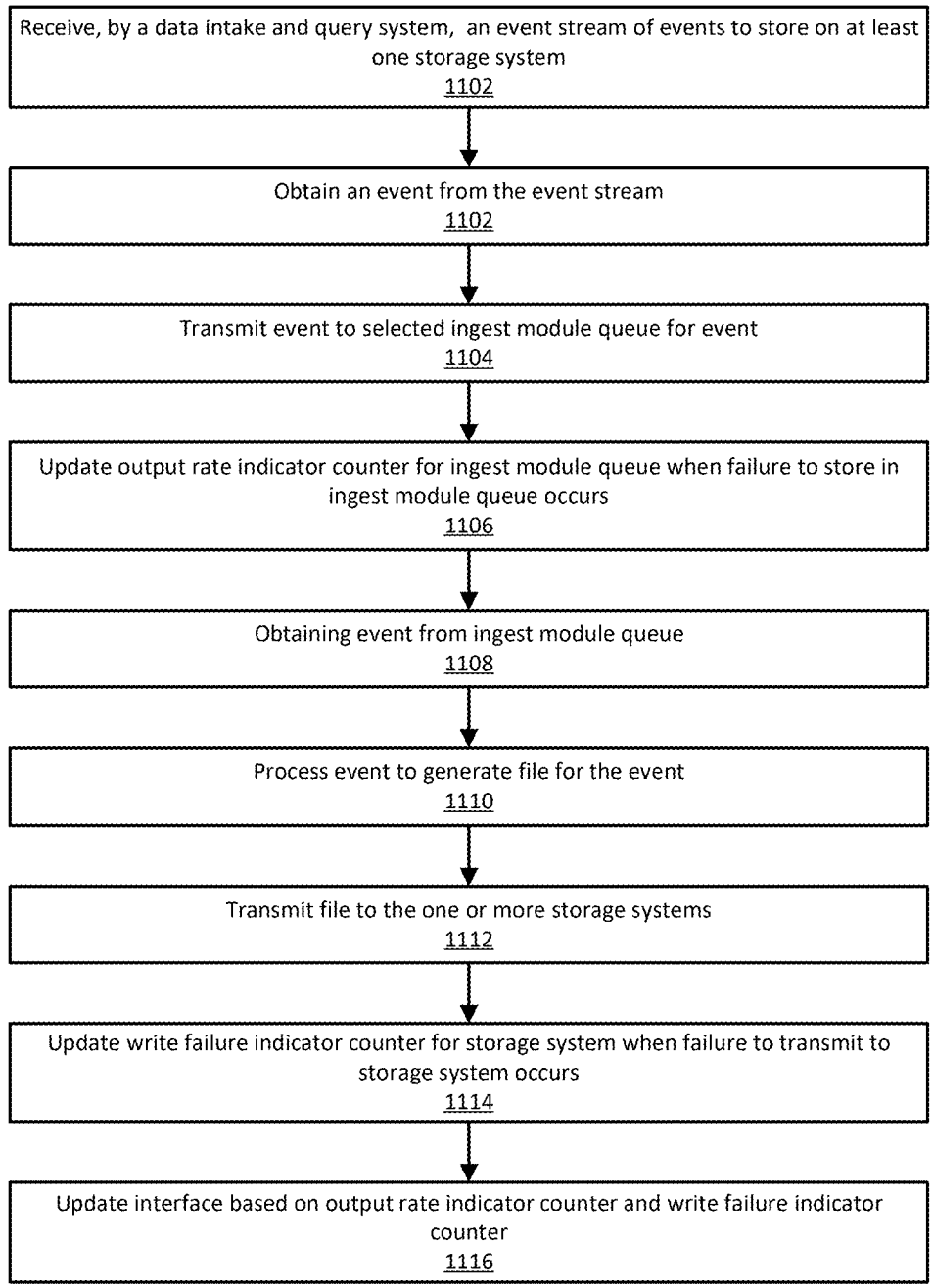
FIG. 11 illustrates an example process for health monitoring.
Figure 12:
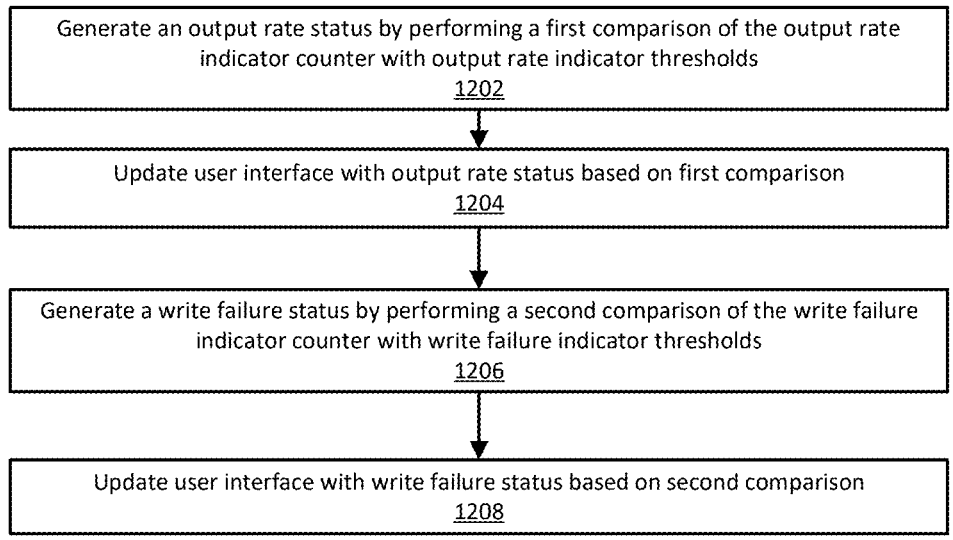
FIG. 12 illustrates an example process for generating a health report.

FIGS. 9 and 10 show flowcharts for transmitting events to multiple storage systems. FIGS. 11 and 12 show flowcharts for health monitoring while transmitting events.

FIG. 9 illustrates an example process 900 for transmitting events to multiple storage systems. Specifically, FIG. 9 shows the operations that may be performed to process an event. In Block 902, field values from a field are extracted. The ingest module parses the events to identify the field values from the event.

In Block 904, the field values are matched to the configurations of the storage systems to identify at least a subset of the storage systems having a matching configuration. The field values of the fields identified in the storage system rules are compared against the storage system rules to identify the subset of storage systems to store the event. One way to perform the matching is through the execution of the conditional statements discussed above. The conditional statement is executed using the field values of the event. If the conditional statement evaluates to true, then the storage systems referenced by the conditional statements are identified and added to the subset of the storage systems that will store the event. Some events may be stored on all storage systems while some events may be stored on a subset of storage systems having one or more storage systems.

In Block 906, the event is transmitted to the subset of storage systems. Transmitting the event includes processing the event and sending the event to the storage system. For example, the storage system rules may be used to determine the connection parameters for the storage system and the security credentials. The event is sent using the connection parameters and the security credentials.

If an ingest module queue is used, transmitting the event includes storing the event in the ingest module queue of each storage system in the subset of storage systems. After determining the subset of storage systems to receive the event, the output processor may use a mapping function that maps the storage system identifier to the ingest module queue of the storage system ingest module that transmits the storage system identified by the storage system identifier. The output processor uses the mapping function to add a copy of or a reference to the event to each ingest module queue of each storage system in the subset of storage systems. As discussed above with reference to FIG. 5, multiple output processors may be concurrently processing events and adding events to the same ingest module queue.

FIG. 10 illustrates an example process 1000 for processing an event from an ingest module queue by the storage system ingest module. Specifically, FIG. 10 shows a flowchart for transmitting an event using a storage system ingest module of FIG. 2. In Block 1002, an event is obtained from the ingest module queue for the corresponding storage system. The event partition processor, or a thread thereof, removes the event from the ingest module queue in FIFO order.

In Block 1004, a partition is selected for the event based on the field values of the event and a partitioning rule for the storage system. The event partition processor implements the partitioning scheme for the storage system. In particular, the partition processor makes a determination whether the event should be in a same or different partition than any of the partitions currently in the partition queue. The comparison is performed by comparing the field values of the events in the partition to the field values of the new event being processed according to the partitioning scheme. Because the partitioning scheme only partitions events on a subset of the field values, only the field values in the subset are compared. If the field values match (e.g., are the same or are the same range as defined by the partitioning scheme), then the partition in the partition queue is identified. If the event should be in a same partition as a partition existing in the partition queue, the event is stored in the identified partition in Block 1006. If a matching partition is not identified, a new partition is created for the event in the partition queue and the event is stored in the new partition in Block 1006.

Concurrently, with adding events to a partition of the partition queue, a determination is made whether to evict a partition in Block 1008. If the determination is made not to evict, flow continues with Block 1002 for the partition. If the determination is made to evict, the flow proceeds to Block 1010. The determination of Block 1008 may be performed as follows. The file processor executes threads that determine which partitions of the partition queue may be evicted. For example, one or more software threads may iterate through the partition queue and determine whether the threshold file size is satisfied by the partition (e.g., the partition meets or exceeds the threshold file size), or the elapse time since the first event was added to the partition satisfies the threshold timeout period. If a condition for eviction is satisfied, the partition is marked by the software threads that may mark the partition as ready for eviction. If a condition for eviction is not satisfied, then the partition may remain in the partition queue until a condition for eviction is satisfied.

In some cases, no new partitions may be added to the partition queue, no partitions are ready to be evicted, and a matching partition is not found. In such a scenario, the partition queue may prematurely evict a partition. For example, the oldest partition in the partition queue may be marked for eviction. Thus, space is created for the new partition of the new event.

Continuing with FIG. 10, at Block 1010, events in a partition queue of a partition are evicted. The entire partition of events is concurrently evicted and grouped. The file processor obtains the oldest partition in the partition queue that is marked for eviction. The file processor processes the events in the partition to obtain file having the events. Processing the events may include ordering events if not already ordered into timestamp order, identifying a first timestamp of the first event and last timestamp of the last event in timestamp order, and generating a file name based on the timestamps and other information described above. Further, the file processor determines a pathname to the file in the file system. Determining the pathname is performed by identifying the subset of field values of the events that define the partition and ordering the field values according to the hierarchy of the partitioning scheme. The subset of field values may individually be transformed to match the path naming scheme, such as using just the value or using key-value pairs. The pathname for the leaf folder having the file of the partition is appended to the pathname of the storage system, and the resulting pathname is appended to the file name to create the URL. The file processor may also reformat events in the file, such as to create a JSON file from the events and to perform compression operations on the file.

In Block 1012, the file is transmitted to the storage system. Specifically, the connection credentials for the storage system and the storage interface is used to transmit the file to the storage system. The file may be transmitted to a local storage system or to a remote storage system, such as via a network.

As shown in FIG. 9 and FIG. 10, the same event may be transmitted to each storage system, where each storage system has a corresponding partitioning scheme. Thus, the system provided herein provides a flexible mechanism to send events to multiple storage systems.

In the process of performing the operations of FIGS. 9 and 10, failure may exist in the system. To address the failure, health indicator values are used. FIG. 11 provides a technique for health monitoring and FIG. 12 provides a technique to generate the health report. The operations of FIG. 11 and FIG. 12 may be performed in conjunction with the operations of FIG. 9 and FIG. 10 or as a separate process.

Turning to FIG. 11, in Block 1102, a data intake and query system receives an event stream of events to store on at least one storage system. The event stream is received as described above. Specifically, one or more data sources transmit, directly or indirectly, events in the form of an event stream to an indexer pipeline that performs an initial set of processing on the events.

In Block 1102, an event is obtained from the event stream. The output processor obtains the event from the event stream and individually processes the event. The output processor identifies a selected ingest module queue based on the storage system to store the event.

In Block 1104, the output processor transmits the event to the selected ingest module queue for the event. Specifically, the output processor attempts to store the event in the selected ingest module queue for the event.

In Block 1106, the output processor updates the output rate indicator counter for the ingest module queue when failure to store the event in the ingest module queue occurs. When the failure occurs, the output processor sends a notification to the output rate tracker. The output rate tracker determines based on the target ingest module queue, the output rate indicator counter that should be updated. The output rate tracker then updates the output rate indicator counter. When performing the update, the output rate tracker may also perform the operations of FIG. 12 to determine whether to issue an alert. If the storage is successful, the output processor may notify the output rate tracker to reset the output rate indicator counter.

Continuing with FIG. 11, in Block 1108, the event is obtained from the ingest module queue and processed in Block 1110 to generate a file for the event. The file is transmitted to one or more storage systems in Block 1112.

In Block 1114, the file processor updates the write failure indicator counter for the storage system when failure to transmit the file having the event occurs. When the failure occurs, the file processor sends a notification to the write failure tracker. The write failure tracker determines based on the storage system, the write failure indicator counter that should be updated. The write failure tracker then updates the write failure indicator counter. When performing the update, the write failure tracker may also perform the operations of FIG. 12 to determine whether to issue an alert. If the transmission is successful, the file processor may notify the write failure tracker to reset the write failure indicator counter.

In Block 1116, the interface is updated based on the output rate indicator counter and the write failure indicator counter. For example, a log entry may be generated, or a health report may be presented.

FIG. 12 illustrates an example process for generating a health report. The process of FIG. 12 may be performed for the storage system to update the health report with the storage system. In Block 1202, an output rate status is generated by performing a first comparison of the output rate indicator counter with the output rate indicator thresholds. The output rate indicator counter is compared against the respective thresholds to determine the output rate health status. If no thresholds are satisfied, then the output rate health status is positive. If one or more thresholds are satisfied, the health status worsens. In Block 1204, the user interface is updated with the output rate status based on the first comparison. Updating the user interface includes adding an alert to the user interface when the health status is not positive. Further, a reason for the negative health status may be added to the user interface.

Continuing with FIG. 12, In Block 1206, a write failure status is generated by performing a second comparison of the write failure indicator counter with the write failure indicator thresholds. The write failure indicator counter is compared against the respective thresholds to determine the write failure health status. If no thresholds are satisfied, then the write failure health status is positive. If one or more thresholds are satisfied, the health status worsens. The user interface is updated with the write failure status in Block 1208 based on the second comparison. Updating the user interface includes adding an alert to the user interface when the health status is not positive. Further, a reason for the negative health status may be added to the user interface.

By providing the respective indicators, a user may be notified when ingesting the events is not performed correctly. Thus, the user may adjust configuration parameters, add additional threads, or perform other operations to correct the operations of ingesting events.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources)

are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest, and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
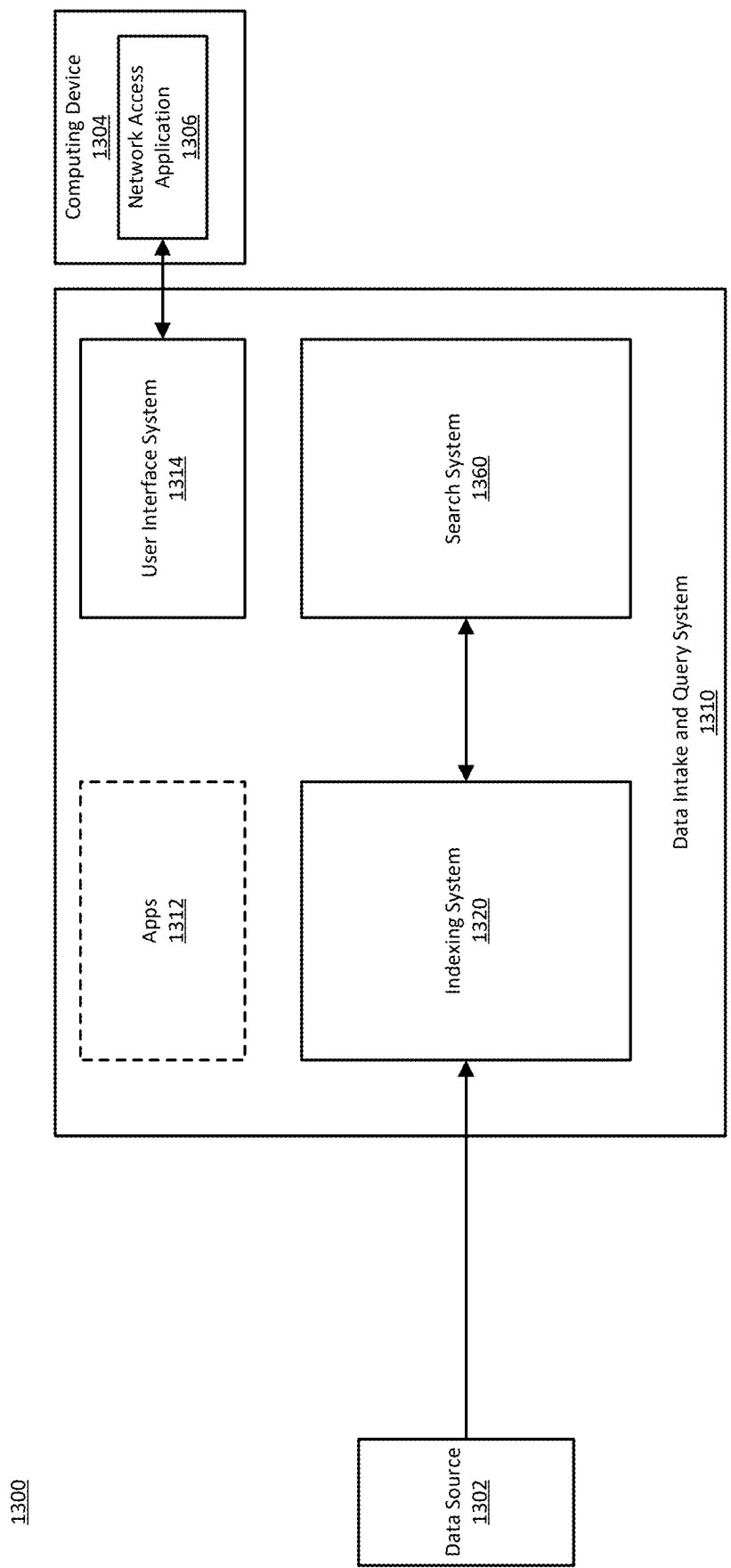
FIG. 13 illustrates an example schematic diagram of data ingest with in an indexing system in the data intake and query system in which FIG. 1 may be implemented.

FIG. 13 is a block diagram illustrating an example computing environment 1300 that includes a data intake and query system 1310. The data intake and query system 1310 obtains data from a data source 1302 in the computing environment 1300 and ingests the data using an indexing system 1320. A search system 1360 of the data intake and query system 1310 enables users to navigate the indexed data. Though drawn with separate boxes in FIG. 13, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1310 can be executed on a single computing device, or execution of the program code can be distributed over multiple computing devices. For example, the program code can include instructions for both indexing and search components (which may be part of the indexing system 1320 and/or the search system 1360, respectively), which can be executed on a computing device that also provides the data source 1302. As another example, the program code can be executed on one computing device, where execution of the program code provides both indexing and search components, while another copy of the program code executes on a second computing device that provides the data source 1302. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing 1320 system. As discussed in greater detail below, the search system 1360 enables users associated with the computing environment 1300 (and possibly also other users) to navigate the data, generate reports, and visualize search results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries that are to be processed by the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, such as a web browser, which can use a network interface of the client computing device 1304 to communicate, over a network, with the user interface system 1314 of the data intake and query system #A110. The user interface system 1314 can use the network access application 1306 to generate user interfaces that enable a user to interact with the data intake and query system #A110. A web browser is one example of a network access application. A shell tool can also be used as a network access application. In some examples, the data intake and query system 1310 is an application executing on the computing device 1306. In such examples, the network access application 1306 can access the user interface system 1314 without going over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
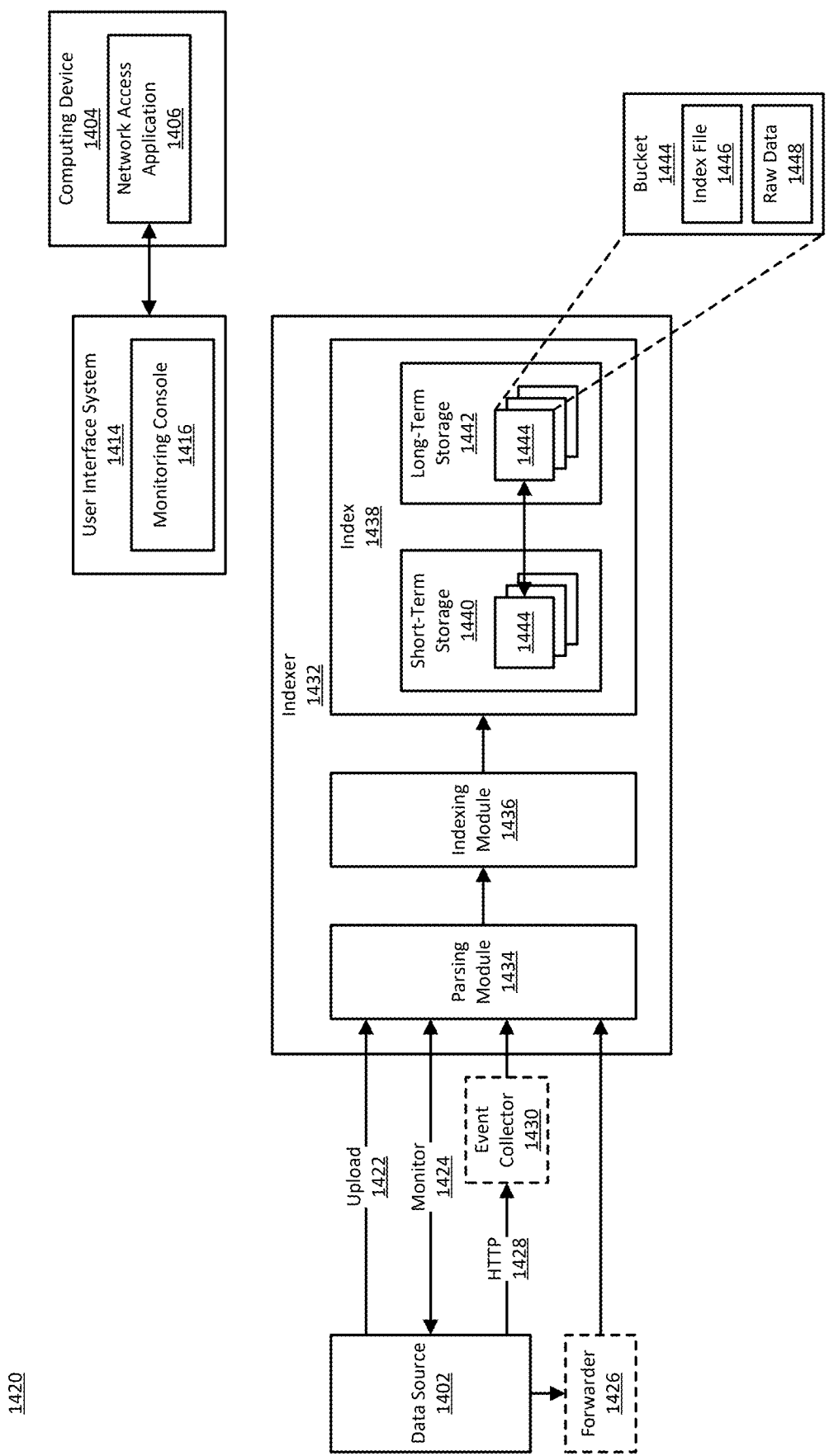
FIG. 14 illustrates an example schematic diagram of search in the data intake and query system in which FIG. 1 may be implemented.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for data ingestion; configuring the indexer 1432 to index the data from the data source 1432; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device than the illustrated computing device 1404.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can specify a file for uploading into the indexer 1432. For example, the monitoring console 1416 can include commands or an interface through which the user can specify where the file is located (e.g., on which computing device and/or in which directory of a file system) and the name of the file. The file may be located at the data source 1402 or maybe on the computing device where the indexer 1432 is executing. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1402 to monitor the data source 1402 and continuously or periodically obtain data produced by the data source 1402 for ingestion by the indexer 1432. For example, using the monitoring console 1416, a user can specify a file or directory for monitoring. In this example, the indexing system 1402 can execute a monitoring process that detects whenever the file or directory is modified and causes the file or directory contents to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the forwarder 1426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data before sending the data to the indexer 1432. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and .NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value (i.e., field value), and in some cases the event includes only the value, and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated in FIG. 14 to facilitate discussion, with the understanding that implementations with other components are possible to achieve the same functionality.

The parsing module 1434 determines information about incoming event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field in the event data or using machine learning techniques applied to the event data.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields (key-value pairs) for each event, such as a host or hostname, source or source name, and/or source type. The parsing module 1434 may extract certain fields by default or based on a user configuration. Alternatively, or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing component 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can manage more than one index and can manage indexes of different types. For example, the indexer 1432 can manage event indexes, which impose minimal structure on stored data and can accommodate any type of data. As another example, the indexer 1432 can manage metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing component 1434 may add fields to event data and/or perform transformations on fields in the event data. Event data that has been altered in this way is referred to herein as enriched data. A raw data file 1448 can include enriched data, in addition to or instead of raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may be moves from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each bucket must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
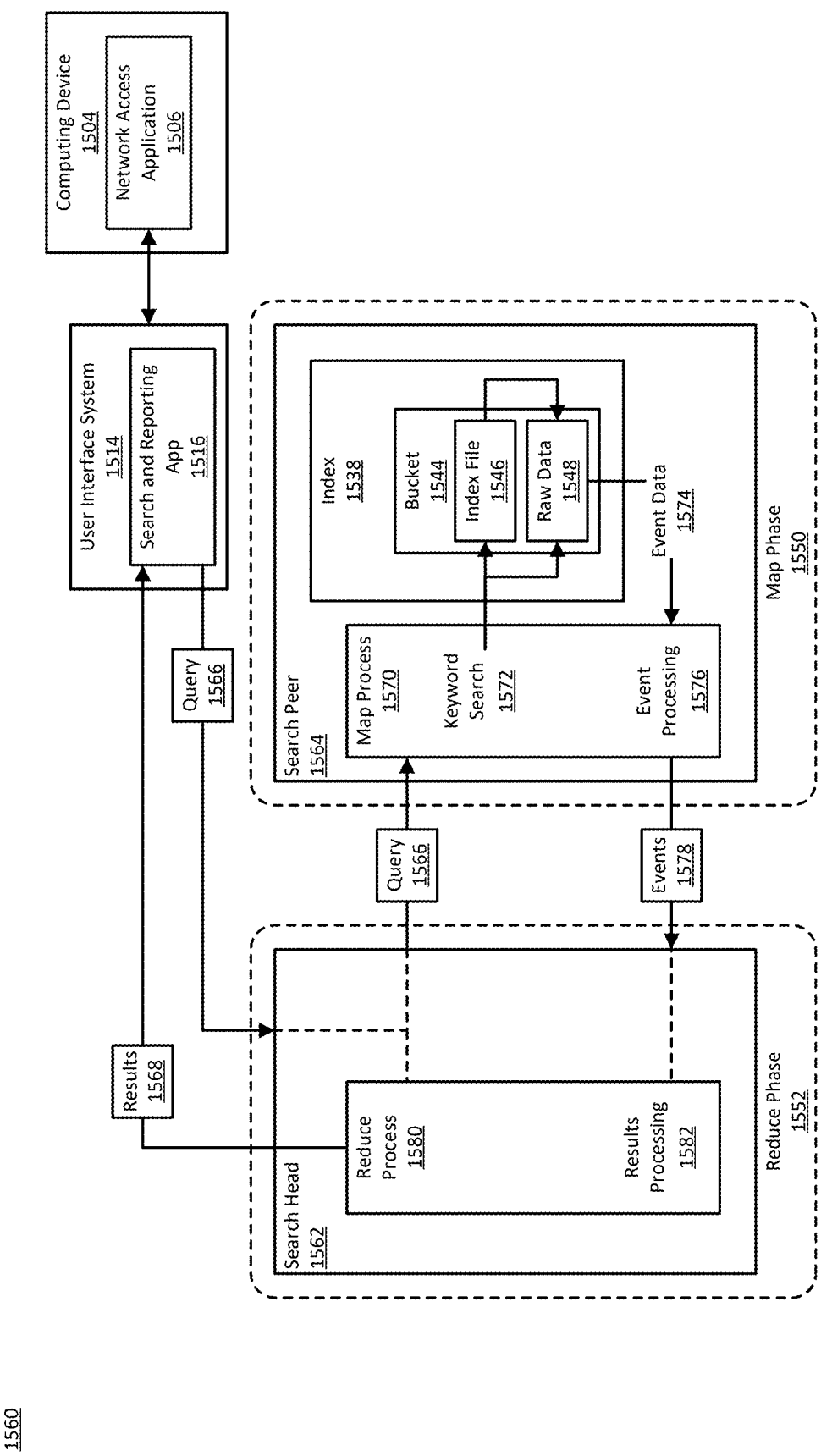
FIG. 15 illustrates an example diagram of an on premises data intake and query system in which FIG. 1 may be implemented.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively, or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands or search terms that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data and are implanted using different hardware resources q. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1574 using search terms specified in the search query #A66. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches a search term in the query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data #A74 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the received events. The results processing 1582 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

The reduce process 1580 outputs the events found by the search query 1566, as well as information about the events. The search head 1562 transmits the events and the information about the events as search results 1568, which are received by the search and reporting app 1516. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively, or additionally, the search and reporting app 1516 can include functionality that enables a user to configure custom dashboards.

The search and reporting app 1516 can also enable further investigation into the events in the search results 1516. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
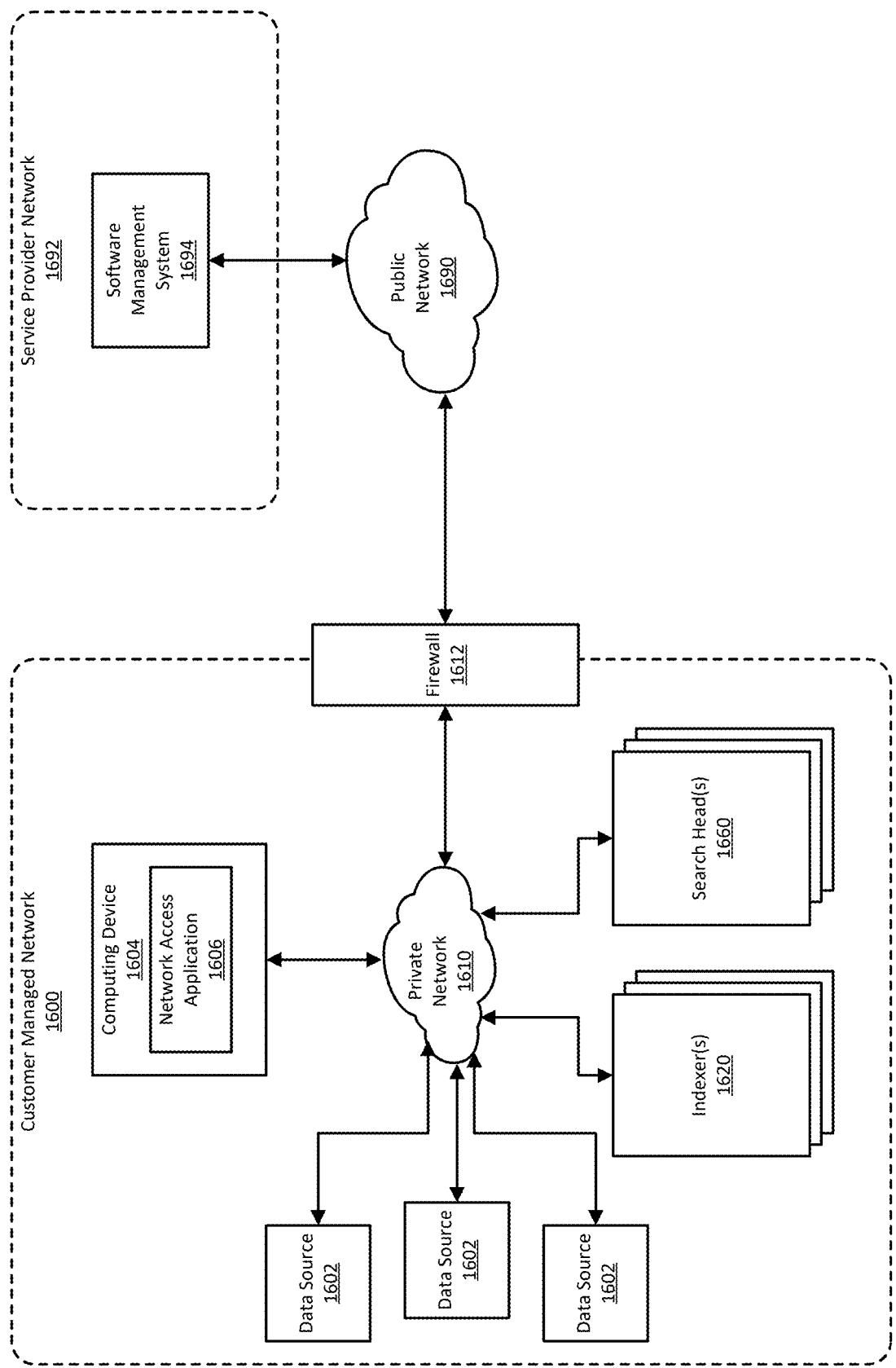
FIG. 16 illustrates an example diagram of a self-managed network that includes a data intake and query system in which FIG. 1 may be implemented.

FIG. 16 illustrates an example of a self-managed network 1600 that includes a data intake and query system. "Self-managed" in this instance means that the entity that is operating the self-managed network 1600 configures, administers, maintains, and/or operates the data intake and query system using its own compute resources and people. Further, the self-managed network 1600 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1600 is located within the customer's on-prem environment, such as in the entity's data center, the operation and management of the self-managed network 1600, including of the resources in the self-managed network 1600, is under the control of the entity. For example, administrative personnel of the entity have complete access to and control over the configuration, management, and security of the self-managed network 1600 and its resources.

The self-managed network 1600 can execute one or more instances of the data intake and query system. An instance of the data intake and query system may be executed by one or more computing devices that are part of the self-managed network 1600. A data intake and query system instance can comprise an indexing system and a search system, where the indexing system includes one or more indexers 1620 and the search system includes one or more search heads 1660.

As depicted in FIG. 16, the self-managed network 1600 can include one or more data sources 1602. Data received from these data sources may be processed by an instance of the data intake and query system within self-managed network 1600. The data sources 1602 and the data intake and query system instance can be communicatively coupled to each other via a private network 1610.

Users associated with the entity can interact with and avail themselves of the functions performed by a data intake and query system instance using computing devices. As depicted in FIG. 16, a computing device 1604 can execute a network access application 1606 (e.g., a web browser), that can communicate with the data intake and query system instance and with data sources 1602 via the private network 1610. Using the computing device 1604, a user can perform various operations with respect to the data intake and query system, such as management and administration of the data intake and query system, generation of knowledge objects, and other functions. Results generated from processing performed by the data intake and query system instance may be communicated to the computing device 1604 and output to the user via an output system (e.g., a screen) of the computing device 1604.

The self-managed network 1600 can also be connected to other networks that are outside the entity's on-premise environment/network, such as networks outside the entity's data center. Connectivity to these other external networks is controlled and regulated through one or more layers of security provided by the self-managed network 1600. One or more of these security layers can be implemented using firewalls 1612. The firewalls 1612 form a layer of security around the self-managed network 1600 and regulate the transmission of traffic from the self-managed network 1600 to the other networks and from these other networks to the self-managed network 1600.

Networks external to the self-managed network can include various types of networks including public networks 1690, other private networks, and/or cloud networks provided by one or more cloud service providers. An example of a public network 1690 is the Internet. In the example depicted in FIG. 16, the self-managed network 1600 is connected to a service provider network 1692 provided by a cloud service provider via the public network 1690.

In some implementations, resources provided by a cloud service provider may be used to facilitate the configuration and management of resources within the self-managed network 1600. For example, configuration and management of a data intake and query system instance in the self-managed network 1600 may be facilitated by a software management system 1694 operating in the service provider network 1692. There are various ways in which the software management system 1694 can facilitate the configuration and management of a data intake and query system instance within the self-managed network 1600. As one example, the software management system 1694 may facilitate the download of software including software updates for the data intake and query system. In this example, the software management system 1694 may store information indicative of the versions of the various data intake and query system instances present in the self-managed network 1600. When a software patch or upgrade is available for an instance, the software management system 1694 may inform the self-managed network 1600 of the patch or upgrade. This can be done via messages communicated from the software management system 1694 to the self-managed network 1600.

The software management system 1694 may also provide simplified ways for the patches and/or upgrades to be downloaded and applied to the self-managed network 1600. For example, a message communicated from the software management system 1694 to the self-managed network 1600 regarding a software upgrade may include a Uniform Resource Identifier (URI) that can be used by a system administrator of the self-managed network 1600 to download the upgrade to the self-managed network 1600. In this manner, management resources provided by a cloud service provider using the service provider network 1692 and which are located outside the self-managed network 1600 can be used to facilitate the configuration and management of one or more resources within the entity's on-prem environment. In some implementations, the download of the upgrades and patches may be automated, whereby the software management system 1694 is authorized to, upon determining that a patch is applicable to a data intake and query system instance inside the self-managed network 1600, automatically communicate the upgrade or patch to self-managed network 1600 and cause it to be installed within self-managed network 1600.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   receiving an event stream of events in a data intake and query system to store on at least one storage system;
   obtaining a first event from the event stream;
   processing the first event to generate a first file for the event;
   transmitting the first file to the at least one storage system;
   updating a write failure indicator counter for a storage system of the at least one storage system when failure to transmit the first file to the storage system occurs;
   generating a write failure status by performing a first comparison of the write failure indicator counter with a write failure indicator threshold; and
   updating a user interface with the write failure status based on the first comparison.

2. The computer-implemented method of claim 1, further comprising:
   obtaining a second event from the event stream;
   processing the second event to generate a second file for the event;
   transmitting the second file to the at least one storage system;
   updating a write failure indicator counter for a storage system of the at least one storage system when failure to transmit the second file to the storage system occurs; and
   resetting the write failure indicator counter upon success of transmission of the second file to the storage system.

3. The computer-implemented method of claim 1, wherein the write failure indicator threshold is a warning write failure indicator threshold, and wherein the method further comprises:
   performing a second comparison of the write failure indicator counter with an error write failure indicator threshold, wherein the write failure status is further generated according to the second comparison; and
   updating the user interface with the write failure status based on the second comparison.

4. The computer-implemented method of claim 1, further comprising:
   determining from the first comparison that the write failure indicator counter is above an error write failure indicator threshold, and from a second comparison that the write failure indicator counter is below a warning write failure indicator threshold; and
   setting the write failure status as in warning status responsive to the determining.

5. The computer-implemented method of claim 1, further comprising:
   determining from the first comparison that the write failure indicator counter is above an error write failure indicator threshold; and
   setting the write failure status as error mode status responsive to the determining.

6. The computer-implemented method of claim 1, wherein the at least one storage system comprises a plurality of storage systems each related to a corresponding write failure indicator counter.

7. The computer-implemented method of claim 1, further comprising:
   displaying, in the user interface, a root cause of the write failure status comprising an explanation of a possible reason for the write failure status to exceed a write failure indicator threshold.

8. The computer-implemented method of claim 1, further comprising:
   displaying, in the user interface, a set of related messages from a file processor to a write failure tracker.

9. The computer-implemented method of claim 1, further comprising:
   storing a log entry comprising a date of the write failure indicator threshold being exceeded, a name of the write failure indicator counter that exceeded the write failure indicator threshold, a value of the write failure indicator counter, and the value of the write failure indicator threshold.

10. A computing device, comprising:
    a processor; and
    a non-transitory computer-readable medium having stored thereon instructions that, when executed by the processor, cause the processor to perform operations including:
    receiving an event stream of events in a data intake and query system to store on at least one storage system,
    obtaining a first event from the event stream,
    processing the first event to generate a first file for the event,
    transmitting the first file to the at least one storage system,
    updating a write failure indicator counter for a storage system of the at least one storage system when failure to transmit the first file to the storage system occurs,
    generating a write failure status by performing a first comparison of the write failure indicator counter with a write failure indicator threshold, and
    updating a user interface with the write failure status based on the first comparison.

11. The computing device of claim 10, wherein the operations further comprise:
   obtaining a second event from the event stream;
   processing the second event to generate a second file for the event;
   transmitting the second file to the at least one storage system;
   updating the write failure indicator counter for a storage system of the at least one storage system when failure to transmit the second file to the storage system occurs; and
   resetting the write failure indicator counter upon success of transmission of the second file to the storage system.

12. The computing device of claim 10, wherein the write failure indicator threshold is a warning write failure indicator threshold, and wherein the operations further comprise:
   performing a second comparison of the write failure indicator counter with an error write failure indicator threshold, wherein the write failure status is further generated according to the second comparison; and
   updating the user interface with the write failure status based on the second comparison.

13. The computing device of claim 10, wherein the operations further comprise
   determining from the first comparison that the write failure indicator counter is above an error write failure indicator threshold, and from a second comparison that the write failure indicator counter is below a warning write failure indicator threshold; and
   setting the write failure status as in warning status responsive to the determining.

14. The computing device of claim 10, wherein the operations further comprise:
   determining from the first comparison that the write failure indicator counter is above an error write failure indicator threshold; and
   setting the write failure status as error mode status responsive to the determining.

15. The computing device of claim 10, wherein the at least one storage system comprises a plurality of storage systems each related to a corresponding write failure indicator counter.

16. The computing device of claim 10, wherein the operations further comprise:
   displaying, in the user interface, a root cause of the write failure status comprising an explanation of a possible reason for the write failure status to exceed a write failure indicator threshold.

17. The computing device of claim 10, wherein the operations further comprise:
   displaying, in the user interface, a set of related messages from a file processor to a write failure tracker.

18. The computing device of claim 10, wherein the operations further comprise:
   storing a log entry comprising a date of the write failure indicator threshold being exceeded, a name of the write failure indicator counter that exceeded the write failure indicator threshold, a value of the write failure indicator counter, and the value of the write failure indicator threshold.

19. A non-transitory computer-readable medium having stored thereon instructions that, when executed by one or more processors, cause the one or more processor to perform operations including:
   receiving an event stream of events in a data intake and query system to store on at least one storage system;
   obtaining a first event from the event stream;
   processing the first event to generate a first file for the event;
   transmitting the first file to the at least one storage system;
   updating a write failure indicator counter for a storage system of the at least one storage system when failure to transmit the first file to the storage system occurs;
   generating a write failure status by performing a first comparison of the write failure indicator counter with a write failure indicator threshold; and
   updating a user interface with the write failure status based on the first comparison.

20. The non-transitory computer-readable medium of claim 19, wherein the operations further comprise:
   obtaining a second event from the event stream;
   processing the second event to generate a second file for the event;
   transmitting the second file to the at least one storage system;
   updating the write failure indicator counter for a storage system of the at least one storage system when failure to transmit the second file to the storage system occurs; and
   resetting the write failure indicator counter upon success of transmission of the second file to the storage system.

* * * * *